Jan. 25, 1949.　　　　E. W. KRAUSE　　　　2,460,091
MEANS FOR SECURING MECHANICAL MEMBERS
TO SHAFTS OR THE LIKE
Filed Feb. 24, 1947

INVENTOR
Erwin W. Krause
BY
William
ATTORNEY

Patented Jan. 25, 1949

2,460,091

UNITED STATES PATENT OFFICE 2,460,091

MEANS FOR SECURING MECHANICAL MEMBERS TO SHAFTS OR THE LIKE

Erwin W. Krause, Milwaukee, Wis., assignor to Allis-Chalmers Manufacturing Company, Milwaukee, Wis., a corporation of Delaware Application February 24, 1947, Serial No. 730,601

6 Claims. (Cl. 287—53)

The present invention relates primarily to an improved form of means for securing mechanical members such as pulleys, gears, sprockets, drives, couplings, etc., to shafts or the like.

Devices employing a taper bored member and a tapered split sleeve member or clamping ring fitting in the bore and adapted to be contracted about a shaft or other mechanical element to be gripped by forcibly moving the sleeve member axially relative to the taper bored member have long been known to the prior art. Such devices are found in pipe and shaft couplings and in power transmitting connections for securing pulleys, gears, etc., in driving and driven relationship to shafts. Numerous means have been employed for clamping and unclamping such devices, chiefly involving threaded elements adapted to force the tapered sleeve member axially relative to the taper bored member.

The present invention is concerned with an improvement in the structural relationship of the clamping and unclamping means to sleeve and bored members of novel form and with a novel form of sleeve.

An object of the present invention concerns the creation of a clamping device which is easy and effective in operation.

Another object concerns the creation of a clamping device which is simple and inexpensive to manufacture.

Still another object concerns the achievement of a structure which is compact and economical of space.

More particularly the invention concerns a novel arrangement of an inclined camming surface on one member and a movable, actuating element mounted in a mating member and actuable to movably engage the inclined camming surface of the first member in a manner to cause relative translational movement of said members, such arrangement being of particular utility in a novel combination with a tapered split sleeve mating with a taper bored hub member.

The invention having the above and still further objects and advantages which may be apparent from a full consideration of the disclosures made herein, may be carried into practical effect as described below with reference to the accompanying drawings in which like reference characters are employed to indicate the same or similar parts throughout the several views:

Fig. 1 of the drawing is a side view partly in section on the line I—I of Fig. 2, of a grooved pulley equipped with means according to the present invention for securing the pulley to a machine shaft;

Figure 1:
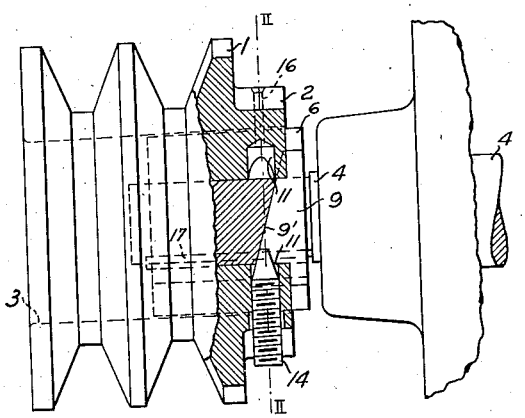

In Figs. 1-5, inclusive, of the drawing, the invention is illustrated as embodied in a grooved pulley member 1, the hub 2 of which is taper bored as shown at 3 to a size considerably larger than the object to which it is desired to attach same. The pulley 1 is adapted for mounting in driving or driven relation on a motor shaft 4 by inserting, in mating relation in the bore 3, an externally frusto-conical, split sleeve, or bushing member 6, which is bored to a size permitting a free sliding fit on shaft 4. The sleeve, or clamping ring, 6 is shown as split longitudinally as by a single slot, or saw kerf, 7 of substantial width, so as to make the sleeve more readily contractible by pressure. The resistance to contraction by pressure may, if desirable, be still further reduced by a saw kerf 8 part way through the wall of the sleeve.

A preferred form of sleeve or clamping ring member, 6, is formed according to the present invention by broaching, or milling, or otherwise providing an oblique secant groove 9 in the tapered, or frusto-conical external surface of sleeve 6, and a second such groove 10 at a mean distance from one end of sleeve 6 different from that of groove 9. Grooves 9 and 10 are preferably formed on opposite sides of the sleeve and extend obliquely to the axis of the sleeve. The grooves 9 and 10 are preferably parallel sided and rectangular in cross-section, with their bottom surfaces generally in planes parallel to and spaced equally from the axis of the sleeve, and parallel to each other. The side surfaces 9', 10' and 10'' are in planes generally perpendicular to the bottom surfaces of their respective grooves, and are oblique to the sleeve axis. The angles of obliquity are preferably equal. It will be noted that groove 9, nearest the larger end of sleeve 6, is only one sided, since the end surface of the sleeve 6 is intersected by the groove bottom. The surface 9' constitutes an oblique camming surface and the surfaces 10' and 10'' of groove 10 constitute similar camming surfaces for a purpose which will be described hereinbelow.

The hub 2 is provided with a pair of guideways 11 and 12, preferably in the form of threaded screw holes. In Figs. 1-5, inclusive, these are shown as having their axes in a common plane perpendicular to the axis of the bore 3. It will be seen that these screw holes 11 and 12 enter the bore (from the outside of the hub 2) in opposite directions, circumferentially, preferably in parallel lines at opposite sides of the bore at equal distances from the axis. The holes 11 and 12 are arranged generally tangentially with reference to the bore 3 to correspond with relationship of the grooves 9 and 10 to the sleeve 6 so that when sleeve 6 is inserted in the bore 3, holes 11 and 12 can simultaneously register with grooves 9 and 10.

The location of holes 11 and 12 axially of bore 3, and the obliquity and locations of grooves 9 and 10 axially of the sleeve 6, are so determined with relation to the sizes and form of the bore 3 and the frusto-conical surface of sleeve 6 that, when the sleeve 6 is inserted in bore 3 as far as it will normally go without forcing, the groove 9 will just register sufficiently, at the end nearest the small end of the sleeve, with the hole 11, so that a suitable actuating means such as screw 14, threadedly engaging the hole 11, will engage surface 9' at an angle. The screw 14 may have a conical tip portion, as shown in the drawing, though this is plainly not necessary to the invention. With the sleeve in position as shown in Fig. 1 the groove 10 will register, at the end nearest the larger end of the sleeve, with hole 12. Both groove 9 (if not open sided as shown) and groove 10 will be made sufficiently wider (axially of the sleeve 6) than the diameter of the corresponding hole, 11 or 12, so that the hole will register with the end of its groove throughout a substantial axial movement of sleeve 6 relative to bore 3, to the left from the position shown in Fig. 1. If, now, the screw 14 is rotated in a direction to make it penetrate farther into the bore 3 and groove 9, it will exert a force on the relatively inclined or oblique surface 9' which will have a component tending to move the sleeve 6 to the left in Fig. 1.

Movement of sleeve 6 to the left (in Fig. 1) relative to bore 3, will cause a compression of sleeve 6 which will force it to contract, making its bore smaller, so that it will tightly grip shaft 4, securely fastening sheave 1 in position relative to such shaft. Screw 14 will prevent unclamping, and also will act as a key to prevent relative rotation between the sheave 1 and sleeve 6.

In order to facilitate assembly, hub 2 may be provided with a pin or key 16 extending into bore 3. The pin 16 will have such a dimension circumferentially of bore 3 as to fit in slot or kerf 7 with clearance sufficient to permit the requisite contraction of sleeve 6 to grip a suitable shaft. And pin 16 will be so located in hub 2, with reference to holes 11 and 12, as to cause proper alignment of grooves 9 and 10 with holes 11 and 12 when sleeve 6 is inserted in the bore. Pin 16 will prevent insertion of sleeve 6 in an improper position, since all other cuts (such as kerf 8) may be made too narrow to permit entry of pin 16. A key 17 may be provided, if desired, to fit suitable keyways in the shaft and sleeve bore and positively fix the angular relationship of sleeve 6 to shaft 4, in the usual manner.

Figure 5:
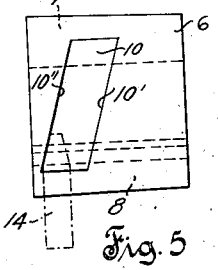
Fig. 5 is a view of the detail of Fig. 3 taken from the rear.

It will be understood that, after clamping, if it is desired to remove sheave 1, screw 14 may be removed from hole 11 and inserted in hole 12 where it will obliquely engage side surface 10'' of groove 10 as shown in Fig. 5, and may be actuated to exert a force tending to withdraw sleeve 6, from bore 3 and unclamp the same. This action is more fully described hereinbelow in connection with the description of operation relating to Figs. 6-9, inclusive, of the drawing which is readily applicable to both forms.

Figs. 6-9, inclusive, show the invention embodied in a modified form of sheave securing mechanism. The reference characters have been changed to a series beginning with 101 for the sheave, 102 for the hub, etc., all parts being given characters similar to those employed in Figs. 1-5, inclusive, except that they are in a series beginning with 101. The device may be described similarly to that illustrated in Figs. 1-5 except as to the differences particularly described hereinbelow.

Holes or guideways 111 and 112 are shown as drilled on axes which are in axially spaced parallel planes perpendicular to the bore axis, at the intersections of such planes with a plane parallel to the bore axis and laterally spaced therefrom. Holes 111 and 112, like 11 and 12, enter hub 2 and penetrate bore 3 preferably from opposite directions, circumferentially. Sleeve 106 is provided with but a single groove 109, of width (axially of sleeve 6) preferably greater than the diameter of hole 111 or 112. The side surfaces of groove 109 are indicated by the character 109' (similar to 9') and 110'' (the functional counterpart 10'' of which is in a different groove in the form shown in Figs. 1-5).

Figure 2:
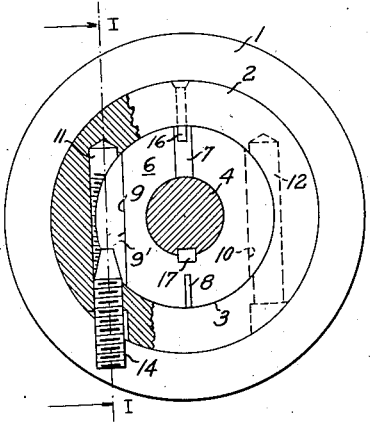
Fig. 2 is an end view partly in cross-section on the line II—II of the pulley shown in Fig. 1.
Figure 3:
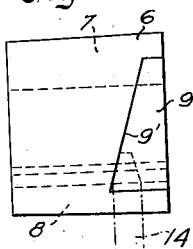
Fig. 3 is a detail view of the split tapered sleeve member of the pulley shown in Fig. 1.
Figure 4:
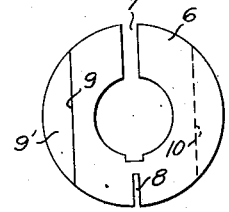
Fig. 4 is an end view of the detail of Fig. 3.
Figures 6, 7, 8:
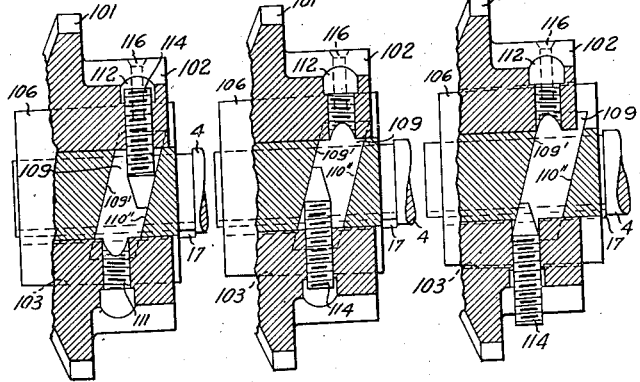
Fig. 6 is a fragmentary view, partly in section on the line VI—VI of Fig. 9, of a pulley, similar to that of Fig. 1, but equipped with a modified form of securing means according to the present invention and shown with the parts in position for unclamping.
Fig. 7 is a fragmentary view similar to Fig. 6, but showing the parts in clamped position.
Fig. 8 is a fragmentary view similar to Fig. 6, but showing the parts in position for clamping.
Figure 9:
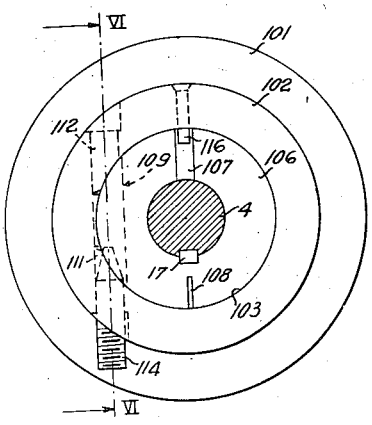
Fig. 9 is an end view of the pulley shown in Figs. 6, 7 and 8 with the parts in the position as shown in Fig. 8.

When sleeve 106 is inserted loosely in bore 103, with pin 116 locating sleeve 106 angularly relative to the bore, and screw 114 is inserted in hole 111, the device takes a position as illustrated in Figs. 8 and 9, similar to that of Figs. 1 and 2. It will be seen that, if screw 114 is rotated to cause further penetration of bore 103 from the position shown in Figs. 8 and 9, the sleeve 106 will be forced, by inclined plane action, to the left, towards the position shown in Fig. 7. Sleeve 106, being forced against the tapered surface of bore 103 towards the smaller end, will be forced to contract and clamp within its bore any shaft slidably fitting the sleeve bore when the sleeve is relaxed. Fig. 7 thus illustrates the mechanism in partially or fully clamped position, with some clearance still available for further clamping action.

If now, the screw 114 is removed from hole 111 and inserted in hole 112, as shown in Fig. 6, inward motion of the screw 114 will, by action of the inclined plane groove side 110'', tend to move sleeve 106 to the right, or in a direction to withdraw it from bore 103, and the sleeve 106 will relax or expand to normal size, and release the clamping pressure.

After clamping pressure has been released, the sheave 101 may be drawn off the shaft; and when screw 114 is retracted from bore 103, the sleeve 106 can be freely removed from the hub 102.

In the form shown in Figs. 1–5 of the drawing, two grooves must be formed in the sleeve, but the axial length of hub portion occupied by holes 11 and 12 is at a minimum. This construction is accordingly advantageous where (as in the case of a sheave or pulley construction) it may be necessary to provide a lateral hub extension to accommodate the holes. In such a construction it will be desirable to limit the axial length of the extension so as to cut down the overall length of the sheave or pulley and locate its driving surface as close as possible to a machine frame from which a shaft projects a limited distance (as motor shaft 4 in Fig. 1). The form shown in Figs. 6–9 is advantageous in that only one groove need be formed in the clamping sleeve; and this form may be preferable where no saving in overall length is required for accommodating the screw holes.

It will be understood that the invention is not intended to be restricted to the precise construction illustrated and described herein, but includes such equivalents and modifications as may readily occur to persons skilled in the art to which it appertains, within the scope of the appended claims.

It is claimed and desired to secure by Letters Patent:

1. A mechanism comprising a member having a tapered bore, a contractible sleeve externally formed to operably fit said bore and mounted in operable relation in said bore, an oblique groove in the external surface of said contractible sleeve forming an oblique camming surface thereon within said bore, a guideway in said member entering said bore in a generally tangential direction in a plane substantially perpendicular to said bore, axially slidably interengageable means on said sleeve and member to assure registry of said groove and guideway in assembly, and actuating means movable in said guideway and having a portion penetrating said bore when in operating position, said portion being operatively engageable with said oblique camming surface to force said member to move axially relative to said contractible sleeve.

2. In a device for clamping members to shafts, rods or pipes, the combination comprising a member having a conically tapered bore substantially larger in diameter than the object to which it is to be clamped, a split sleeve externally tapered to fit said bore and bored internally to substantially fit the object to which said member is to be clamped, said sleeve being mounted in interfitting relation in said bore, said sleeve having an axially extending slot in its external surface, an oblique groove in the external surface of said sleeve within said bore forming an oblique camming surface thereon, a guideway in said member entering said bore in a generally tangential direction in a plane substantially perpendicular to the axis of said bore, said member having a portion projecting radially inward of said bore and engageable with said slot in axially slidable relation to maintain registry of said groove with said guideway, and actuating means movable in said guideway and having a portion extensible into said bore and groove and into operable engagement with said oblique camming surface to force said sleeve to move axially relative to said member.

3. In a shaft, rod or pipe joint of the type involving a tapered contractible clamping ring, clamping mechanism comprising, a member having a tapered bore, a mating tapered contractible clamping ring axially movable in said bore, an obliquely extending groove in a portion of the mating surface of said ring, a pair of threaded screw holes in said member entering said bore tangentially in circumferentially opposite directions, axially slidably interengageable means on said ring and member to assure registry of said groove and holes in assembly, and an actuating screw threadedly engageable in either of said holes and operable to engage at its innermost end with a lateral surface of said groove to force said sleeve to move axially relative to said member.

4. In a shaft, rod or pipe joint of the type involving a tapered contractible clamping means, clamping mechanism comprising a member having a tapered bore, a mating tapered contractible clamping ring axially movable in said bore, a pair of obliquely extending grooves in a portion of the mating surface of said ring at different mean axial distances from one end of said ring, a pair of threaded screw holes in said member and having their longitudinal axes substantially in a common plane perpendicular to the bore axis, said holes entering said bore tangentially in circumferentially opposite directions and registering with said grooves at circumferentially opposite ends respectively through a substantial range of relative movement of said ring and member, and an actuating screw threadedly engageable with either of said holes and operable to engage at its innermost end with lateral surfaces of said grooves to force said sleeve to move axially relative to said member in either direction.

5. In a shaft, rod or pipe joint of the type involving a tapered contractible clamping ring, clamping mechanism comprising, a member having a tapered bore, a mating tapered contractible clamping ring axially movable in said bore, an obliquely extending groove in a portion of the mating surface of said ring, a pair of threaded screw holes in said member entering said bore tangentially in circumferentially opposite directions, and an actuating screw threadedly engageable in either of said holes and operable to engage at its innermost end with a lateral surface of said groove to force said sleeve to move axially relative to said member, the axes of said holes lying at the intersections of parallel axially spaced planes perpendicular to the bore axis with a plane parallel to and spaced from the bore axis, said holes entering said bore from circumferentially opposite directions, said groove registering at opposite ends with both of said holes through a substantial range of relative movement of said sleeve and member.

6. A device for attaching a power transmission member such as pulley or the like to an element such as a shaft or the like, comprising a contractible sleeve keyed to said element in axially slidable non-rotatable relation and having a frusto-conical external surface, a tapered bore in said power transmission member to receive said sleeve in interfitting coaxial relation, axially slidably interengageable means on said sleeve and power transmission member to assure assembly in predetermined relationship, a recess in the frusto-conical surface of said sleeve forming a camming surface arranged obliquely relative to the longitudinal axis of said sleeve, a guideway in said power transmission member penetrating said bore, and actuating means movably engageable with said guideway and having a portion extensible into engagement with said camming surface to cause relative axial movement between said sleeve and said power transmission member.

ERWIN W. KRAUSE.

REFERENCES CITED

The following references are of record in the file of this patent:

UNITED STATES PATENTS

| Number | Name | Date |
|---|---|---|
| 182,523 | Kernaul | Sept. 26, 1876 |
| 2,032,491 | Moreland | Mar. 3, 1936 |